(12) United States Patent
Bucher et al.

(10) Patent No.: US 7,997,327 B2
(45) Date of Patent: Aug. 16, 2011

(54) APPARATUS FOR COMBINED HEAT TRANSFER AND STATIC MIXING WITH A LIQUID

(75) Inventors: Patrick Bucher, Winterthur (CH); Kurt Steiner, Pfaeffikon (CH)

(73) Assignee: Sulzer Chemtech AG, Winterthur (CH)

( * ) Notice: Subject to any disclaimer, the term of this patent is extended or adjusted under 35 U.S.C. 154(b) by 240 days.

(21) Appl. No.: 12/308,214

(22) PCT Filed: Jul. 13, 2007

(86) PCT No.: PCT/EP2007/057268
§ 371 (c)(1),
(2), (4) Date: Dec. 9, 2008

(87) PCT Pub. No.: WO2008/017571
PCT Pub. Date: Feb. 14, 2008

(65) Prior Publication Data
US 2009/0165994 A1    Jul. 2, 2009

(30) Foreign Application Priority Data
Aug. 8, 2006   (EP) .................................... 06118609

(51) Int. Cl.
*F28F 9/013*   (2006.01)
*F28D 7/08*    (2006.01)
(52) U.S. Cl. ........................... 165/81; 165/162; 165/163
(58) Field of Classification Search .................. 165/162, 165/163, 81
See application file for complete search history.

(56) References Cited

U.S. PATENT DOCUMENTS

| | | | | |
|---|---|---|---|---|
| 3,346,043 A | * | 10/1967 | Thurnauer | 165/162 |
| 4,275,177 A | * | 6/1981 | Walkenhorst et al. | 165/163 |
| 4,421,070 A | * | 12/1983 | Sullivan | 165/162 |
| 4,865,460 A | | 9/1989 | Friedrich | |
| 5,484,882 A | * | 1/1996 | Takada et al. | 528/361 |

FOREIGN PATENT DOCUMENTS

| | | |
|---|---|---|
| DE | 1501 614 | 5/1969 |
| DE | 82 02 599 U1 | 6/1982 |
| EP | 0 009 638 | 4/1980 |
| EP | 0 884 548 | 12/1996 |
| EP | 0 776 692 | 6/1997 |
| FR | 77 07639 | 10/1977 |
| GB | 1 376 330 | 12/1974 |
| WO | WO 2004/007063 A1 | 1/2004 |

\* cited by examiner

*Primary Examiner* — Leonard Leo
(74) *Attorney, Agent, or Firm* — Francis C. Hand; Carella, Byrne, Cecchi

(57) ABSTRACT

The apparatus (1) which combines a heat exchange between a liquid (8) and a heat transporting medium (7) with a static mixing of the liquid includes installed structures (2) in a jacket (3). The jacket extends longitudinally between a head end (4) and a base end (5). The installed structures form a heat exchanging and mixing structure. The heat transporting medium can be conveyed from the base end to the head end as an inner flow in tubes (21, 22) of the installed structures. The liquid can be conveyed from the head end to the base end as an outer flow. Reinforcement elements (6, 6', 6") are provided which stabilise the installed structures in the longitudinal direction against pressure gradients generated by the liquid. The installed structures are connected by the reinforcement elements to form a non-expandable part structure (2a) in a main region; they remain at least partly non-reinforced as a longitudinally expandable part structure (2b) and in a secondary region complementary to the main region.

10 Claims, 2 Drawing Sheets

APPARATUS FOR COMBINED HEAT TRANSFER AND STATIC MIXING WITH A LIQUID

Figure 1:
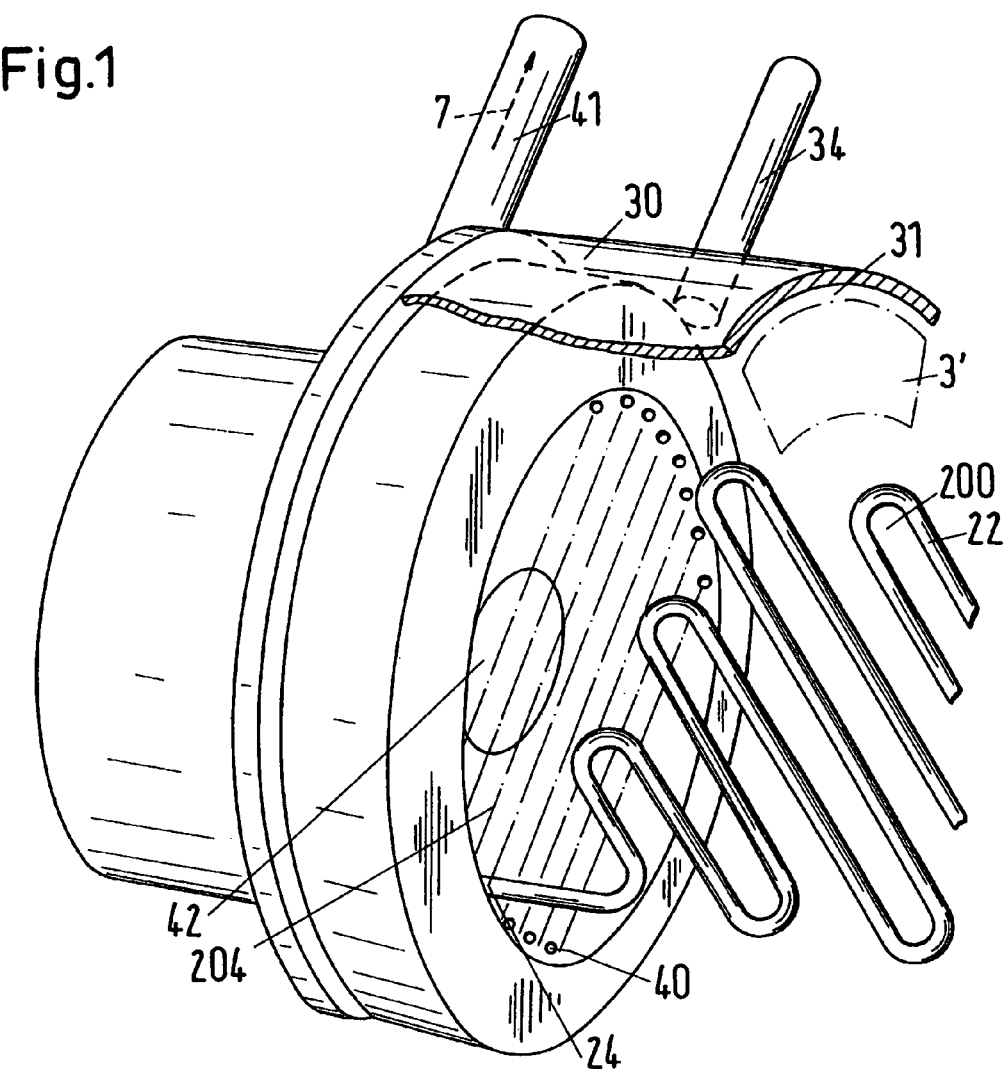

The invention relates to an apparatus combining a heat exchange between a liquid and a heat transporting medium with a static mixing of the liquid. The invention also relates to a use of this apparatus.

EP-A-0 009 638 (U.S. Pat. No. 4,275,177) discloses a heat exchanger made as a reactor with which reaction heat is removed in a polymerisation process to maintain an optimum temperature. This polymerisation reactor includes a tube-like housing and installed structures with which the heat exchange can be carried out from a polymerising mixture, a high-viscosity liquid. The installed structures simultaneously effect a static mixing of this high-viscosity liquid.

A device of this type having a housing and installed structures is an apparatus for which diverse applications have been found. A typical application is the cooling of a polyester melt which is produced in a polycondensation reactor at around 290° C. After the removal of this product from this reactor, the temperature has to be lowered by 10° C. to reduce a decomposition of the product. The cooling has to take place uniformly and with a narrow dwell time spectrum of the polyester melt to obtain a homogeneous product. When manufacturing thin polyester threads, the homogeneity of the melt temperature must be observed very precisely.

The polymerisation reactor known from EP-A-0 009 638 for the combined carrying out of heat exchange and static mixing includes a housing in the form of a jacket which extends longitudinally between a head end and a base end and installed structures which form a heat exchanging and mixing structure. The installed structures consist of tubes which extend in the longitudinal direction and are of serpentine shape. The tubes are occasionally called "heat exchanger/mixing tubes" in the following. Each tube has curved tube parts and these curved tube parts have connecting tube parts which are straight and parallel to one another. The tubes are disposed in planar, contacting layers; and the straight tube parts of adjacent tubes intersect. A heat transporting medium is pumped through the tubes of the installed structures as an inner flow. The tubes are connected at the head end where an inlet position for the outer flow of the product to be cooled is also arranged. The cooled product leaves the apparatus at the base end to which the installed structures are not connected. Thanks to the lack of a connection between the base end and the installed structures, an expansion compensation is superfluous which would be necessary due to different thermal expansion of the installed structures and of the housing. Expansion differences in particular result on start-up because the tube coils adopt the temperature of the heat carrier almost directly, whereas the housing is only heated indirectly and slowly via the polymer in the jacket space.

In the known polymerisation reactor, a heat exchange takes place in multiple steps, namely in each case in parallel flow in a first half of a tube and in counter flow in a second half. The inner flow of the heat transporting medium crosses the outer flow of the high-viscosity liquid due to the serpentine shape so that a cross flow is also combined with the parallel flow and counter flow.

It is the object of the invention to provide an improved apparatus which is made like the known polymerisation reactor in function, with the heat exchange being able to take place more efficiently in this apparatus, however.

The apparatus which combines a heat exchange between a liquid and a heat transporting medium with a static mixing of the liquid includes installed structures in a jacket. The jacket extends longitudinally between a head end and a base end. The installed structures form a heat exchanging and mixing structure. The heat transporting medium can be conveyed from the base end to the head end as an inner flow in tubes of the installed structures. The liquid can be conveyed from the head end to the base end as an outer flow. Reinforcement elements are provided which stabilise the installed structures in the longitudinal direction against pressure gradients generated by the liquid. The installed structures are connected by the reinforcement elements to form a non-expandable part structure in a main region; and they remain at least partly non-reinforced as a longitudinally expandable part structure in a secondary region complementary to the main region.

Figure 2:
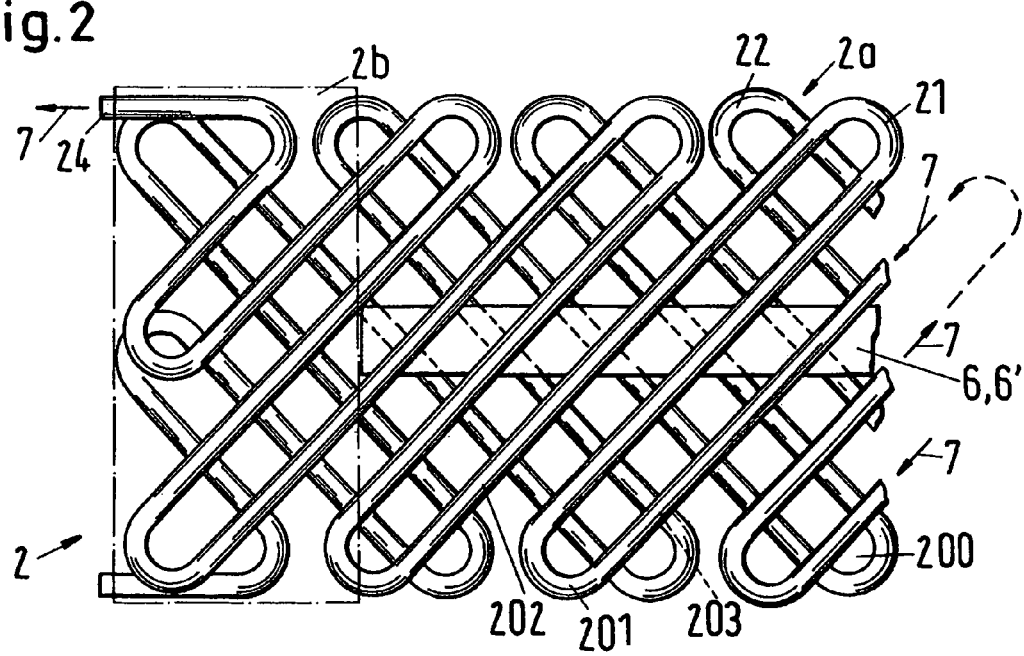
Figure 3:
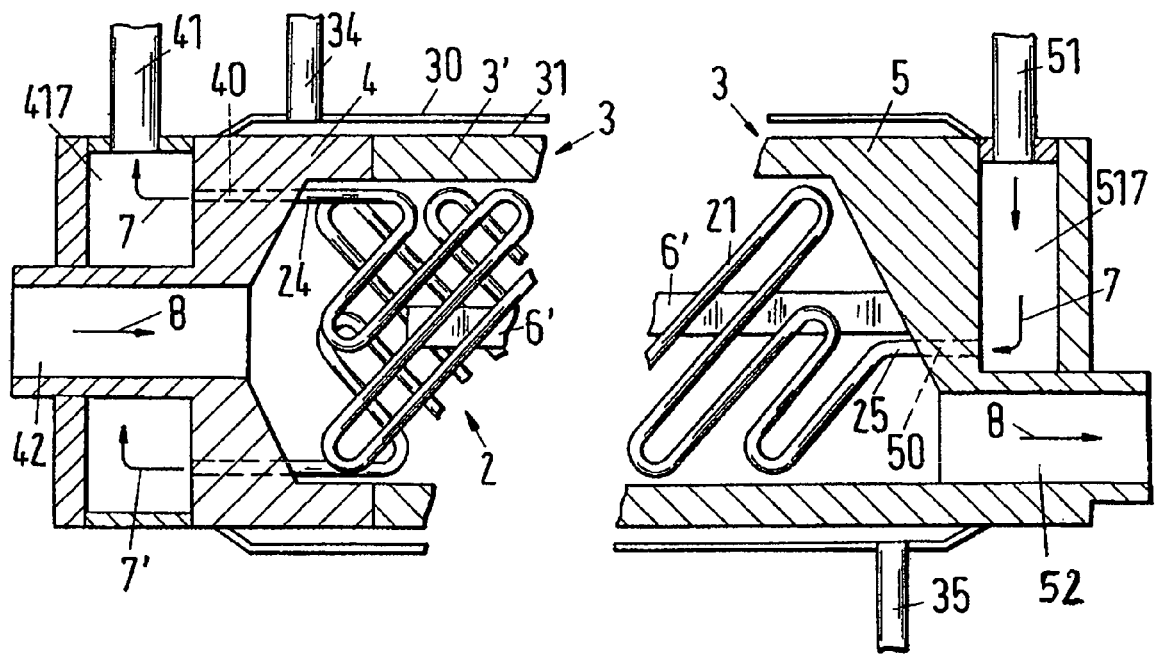
Figure 4:
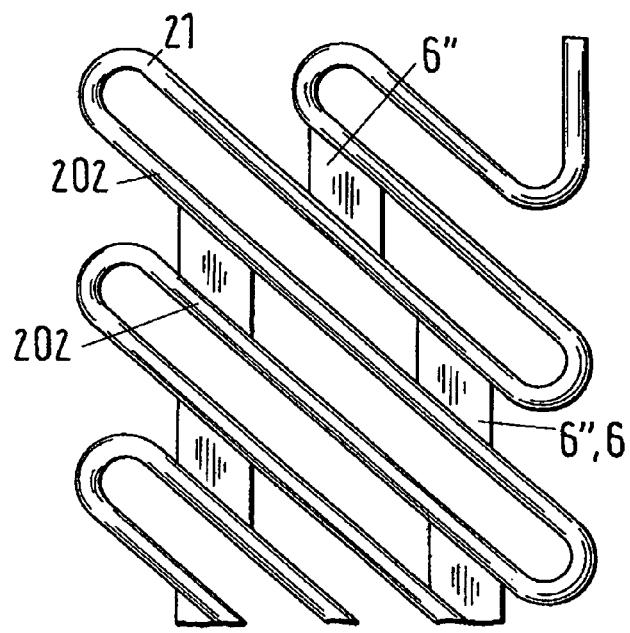

The invention will be explained in the following with reference to the drawings. There are shown:

FIG. 1 a head end of the apparatus in accordance with the invention with a heat exchanger/mixing tube;

FIG. 2 two layers of adjacent heat exchanger/mixing tubes;

FIG. 3 a partly shown longitudinal section of the apparatus in accordance with the invention; and FIG. 4 a further example of reinforcement elements.

An apparatus 1 in accordance with the invention will be described with reference to FIGS. 1 to 4. This apparatus 1, which combines a heat exchange between a liquid 8 and a heat transporting medium 7 with a static mixing of the liquid 8, includes installed structures 2 and a jacket 3 with a tubular housing 3' conducting the liquid 8. The liquid 8 to be treated typically has a relatively high dynamic viscosity of at least 1 Pa·s; in important applications of the apparatus 1 it is a polymer melt which has a pressure of, for example, 50 bar.

The jacket 3 extends longitudinally between a head end 4 and a base end 5. The installed structures 2 form a heat exchanging and mixing structure. The heat transporting medium 7 flows from the base end 5 to the head end 4 as an inner flow in tubes 21, 22 of the installed structures 2. The liquid 8 flows from the head end 4 to the base end 5 as an outer flow. Reinforcement elements 6 (see FIGS. 2 and 4) are provided which stabilise the installed structures 2 in the longitudinal direction against pressure gradients generated by the liquid 8. The installed structures 2 are connected in a main region by the reinforcement elements 6 to form a non-expandable part structure 2a. In a secondary region complementary to the main region, the installed structures 2 remain non-reinforced or only partly reinforced so that a flexible longitudinally expandable part structure 2b is formed (chain-dotted bordered rectangle). Thanks to this flexible part structure 2b, an expansion compensation results which is necessary due to different thermal expansion of the installed structures 2 and of the housing 3' which occur, for example, on the start-up of the apparatus.

In the apparatus 1 in accordance with the invention, the heat exchange takes place in one step, namely in the counter flow. In counter flow, as is known, a larger temperature difference results on average between the inner flow and the outer flow than in parallel flow. The heat exchange can consequently be carried out more efficiently than with the multiple step heat exchange of the known polymerisation reactor. Such a reactor, which has a length of 2 m, can therefore, for example, be replaced by a counter flow reactor which is around 35 cm shorter (with both reactors having the same cross-sectional surfaces and the same cooling capacities). At the same time, the pressure loss of the inner flow (heat carrier in the form of a heat transfer oil) is halved.

The heat exchanger/mixing tubes, i.e. the tubes 21, 22 of the installed structures 2, form planar layers 200 which are arranged in parallel and whose transverse alignment is indicated in FIG. 1 by chain-dotted lines 204. In each layer 200, the tube 22 (or 21) extends like a serpentine, including arcs 201 and parallel part tube pieces 202, from an inlet end 25 at the base end 5 to an outlet end 24 at the head end 4. The part tube pieces 202 of adjacent layers 200 intersect at intersection points 203. In FIG. 3, two adjacent tubes 21 and 22 are shown at the left and only the tube 21 at the right.

In the main region of the installed structures 2, the tubes 21 and 22 of two adjacent layers 200 are fastened on an axial, i.e. longitudinally aligned, bar 6' which forms an advantageous embodiment of the reinforcement elements 6. The bar 6' is fastened to the base end 5 and extends over the non-flexible part structure 2a up to the flexible part structure 2b which makes the expansion compensation possible. An embodiment is also possible in which the bars 6' are fastened to the head end 4 and the flexible part structure 2b is located at the base end 5.

The reinforcement elements 6 are advantageously formed as strip-like plates (not shown), bars 6' (FIG. 2) or connection pieces 6" (FIG. 4) which are arranged distributed over a plurality of points. The strip-like plates are understood as reinforcement elements 6 which are admittedly made up comparably with a bar section, but are arranged is a distributed manner similar to the connection pieces 6" in FIG. 4. Groove-like recesses are provided on the bars 6' or plates for the insertion of the tubes 21 and 22 so that the tubes connected by these plates contact one another or are arranged at relatively small intervals which are substantially smaller than the thickness of the plates. The fastening connections between the tubes and the plates or between the tubes and the bars 6' are preferably established by soldering in a soldering oven. The connections can naturally also be established by welding. In the reinforcement form illustrated in FIG. 4, the connection pieces 6' each connect two adjacent part tube pieces 202. They are preferably welded on.

The non-flexible part structure 2a of the main region is made so resistant that the installed structures remain intact when longitudinal pressure differences occur between the apparatus ends of at least 10 bar, preferably 40 bar, in the outer flow due to the flow resistance.

The apparatus 1 in accordance with the invention is, as a rule, designed such that the head end 4 and the base end 5 are each non-releasably connected to the jacket 3 and to the installed structures 2. In this case, the installed structures 2 cannot be removed. If removable installed structures 2 are required, it can be more advantageous to use the already known apparatus (polymerisation reactor).

The jacket 3 can contain a ring gap space 31 between an outer wall 30 and the tube-like housing 3', with a heat carrier preferably a part of the heat transporting medium 7, being able to be conducted through said ring gap space (inlet line 35 and outlet line 34 of the heat carrier).

The heat exchanger/mixing tubes 21, 22 are attached and fastened to the head end 4 in bores 40 and to the base end 5 in bores 50. The bores 40 are arranged on two ring segments close to the jacket; the bores 50 are arranged on a strip crossing the centre of the base end 5. The heat transporting medium 7 is fed through an inlet line 51 and a distribution chamber 517 into the individual tubes 21, 22 of the installed structures 2 and combined at their outlet in a collection chamber 417 and an outlet line 41.

The head end 4 has a central inlet opening 42 and the base end 5 has an outlet opening 52 arranged next to the centre for the liquid 8. Both openings 42 and 52 can also be arranged at the centre or eccentrically or the inlet opening 42 eccentrically and the outlet opening 52 at the centre.

The apparatus 1 in accordance with the invention can be used, for example, for a polyester melt or another melted polymer (liquid 8) to minimise a decomposition by cooling. Another use is the heating of a polymer to make it more flowable. Another use is the heating or cooling of high-viscosity media in the foodstuff area such as masses of chocolate, caramel or chewing gum. A heat transfer oil is used as a rule as the heat transporting medium 7. Other media such as water or steam can also be used.

The invention claimed is:

1. An apparatus for combining a heat transfer between a liquid and a heat transporting medium with a static mixing of the liquid, said apparatus comprising
    a longitudinally extending jacket having a head end and a base end for conveying a liquid from said head end to said base end as an outer flow;
    a plurality of installed structures disposed in said jacket to form a heat exchanging and mixing structure, each said structure including a serpentine tube having parallel part tube pieces for conveying a heat transporting medium from said base end to said head end as an inner flow; and
    a plurality of reinforcement elements connecting said part tube pieces of said installed structures in a main region within said jacket to form a non-expandable part structure therein and to stabilize said installed structures in a longitudinal direction of said jacket against pressure gradients produced by the liquid, said reinforcement elements being longitudinally spaced from said part tube pieces of said installed structures in a secondary region complementary to said main region whereby said part tube pieces in said secondary region form a longitudinally expandable part structure.

2. An apparatus as set forth in claim 1, characterised in that each said serpentine tube forms a planar layer in parallel to an adjacent serpentine tube and extends in a serpentine manner to define arcs and said parallel part tube pieces from an inlet end to an outlet end thereof and in that said part tube pieces of adjacent layers intersect.

3. An apparatus as set forth in claim 2 wherein said reinforcement elements are connection pieces disposed between adjacent part tube pieces of a respective tube.

4. An apparatus as set forth in claim 1 wherein said reinforcement elements are longitudinally extending bars disposed between adjacent tubes.

5. An apparatus as set forth in claim 1 wherein said main region of said installed structures is made so resistant to expansion that the installed structures remain intact with a longitudinal pressure difference between said head end and said base end of at least 10 bar.

6. An apparatus as set forth in claim 1 wherein said head end is non-releasably connected to said jacket and said installed structures and said base end is non-releasably connected to said jacket and said installed structures whereby said installed structures are non-removable from said jacket.

7. An apparatus as set forth in claim 1 wherein said head end has a plurality of bores receiving a respective end of a respective one of said installed structures and said base end has a plurality of bores receiving a respective opposite end of a respective one of said installed structures.

8. An apparatus as set forth in claim 1 wherein said head end has an inlet opening for the liquid disposed in one of an axial location of said jacket and an eccentric location of said jacket and said base end has an outlet opening for the liquid disposed in one of an axial location of said jacket and an eccentric location of said jacket.

9. An apparatus as set forth in claim 1 further comprising an annular chamber disposed about said jacket for conducting heat transporting medium therethrough.

10. An apparatus as set forth in claim 1 wherein each of said reinforcement elements is a bar fastened to one of said head end and said base end of said jacket and extends over said non-expandable part structure up to said expandable part structure.

\* \* \* \* \*